(No Model.)

J. WATTS.
Nut Lock.

No. 243,019. Patented June 14, 1881.

WITNESSES:
Chas. Nida
C. Sedgwick

INVENTOR:
J. Watts
BY Munn & Co
ATTORNEYS.

UNITED STATES PATENT OFFICE.

JOSEPH WATTS, OF COALBURG, OHIO.

NUT-LOCK.

SPECIFICATION forming part of Letters Patent No. 243,019, dated June 14, 1881.

Application filed March 8, 1881. (No model.)

*To all whom it may concern:*

Be it known that I, JOSEPH WATTS, of Coalburg, in the county of Trumbull and State of Ohio, have invented a new and Improved Nut-Lock, of which the following is a specification.

The object of my invention is to provide a new and improved device for preventing the loosening of nuts by continued shocks or vibrations.

The invention consists in a nut provided with a projection on the inner surface, this projection fitting in a corresponding aperture in a washer provided with one or more projections on the inner surface, which projections snap into grooves in the outer surface of an additional washer placed against the object held by the bolt, this grooved washer resting against flanges or projections of the object united, or one of its corners are bent over to prevent rotation of this inner washer-plate, and consequently of the outer washer-plate and the nut.

Figure 1:
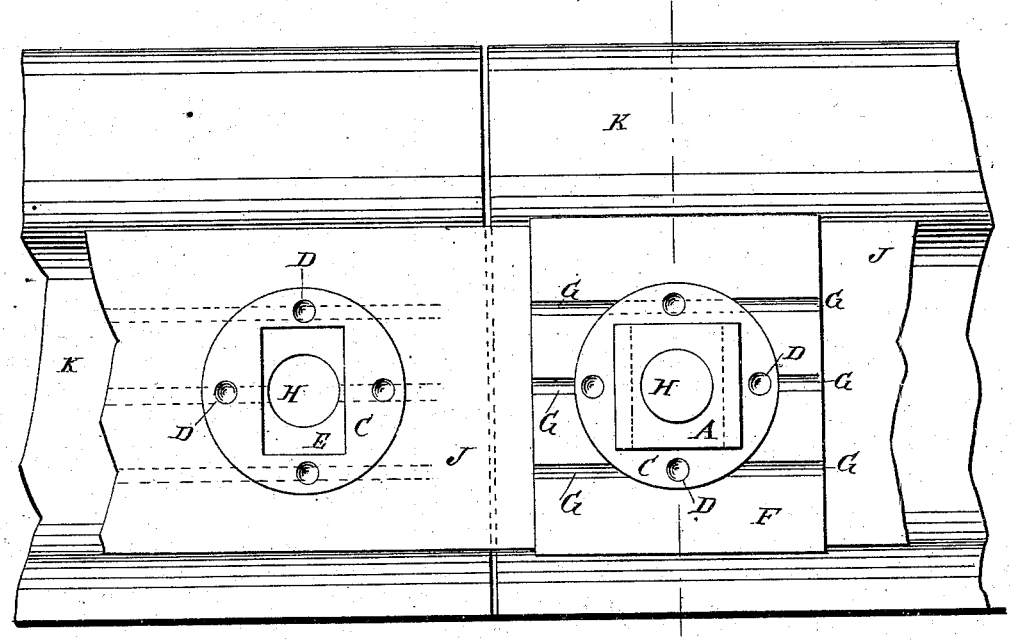
Figures 2, 3, 4:
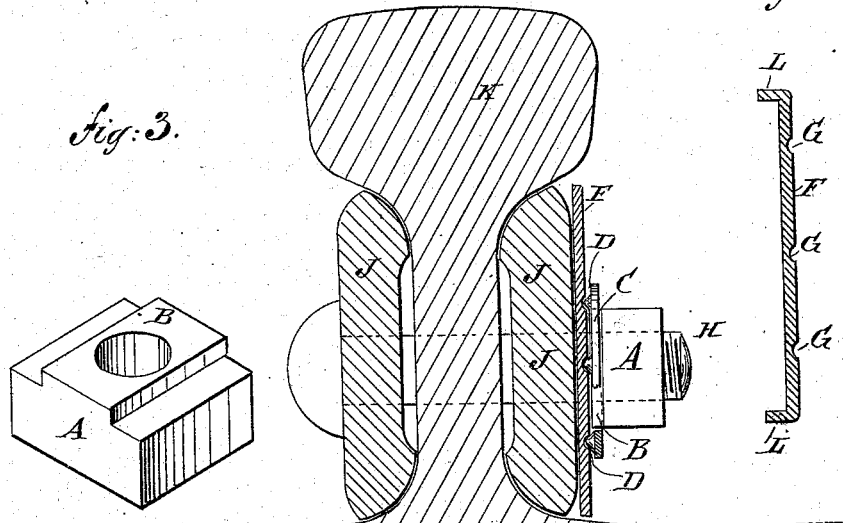

In the accompanying drawings, Figure 1 is a front elevation of a railroad-joint provided with my improved nut-lock, showing the washer-plates with and without the nut screwed on. Fig. 2 is a cross-sectional elevation of the same on the line $x\ x$, Fig. 1. Fig. 3 is a perspective view of the nut. Fig. 4 is a cross-sectional elevation of the grooved washer-plate, showing the edges bent over.

Similar letters of reference indicate corresponding parts.

The nut A is provided on its inner surface with a projection, B, which is preferably square or oblong, but may have any other desired shape except that of a true circle around the center of the bolt. A washer, C, is provided with an aperture, E, of the same size and location as the projection B of the nut, and is also provided with one or more projections, D D, on its inner surface. These projections are preferably made by striking the washer C with a center punch. A square or oblong washer-plate, F, is provided with one or more grooves, G, as recesses in its outer surface.

The nut-lock is applied as follows: The bolt H is passed through the objects to be united—in this case the rail K and the fish-plates J—and the washer F is placed against one of the fish-plates J with the grooved surface to the outside, and the washer C is placed against the washer F with the projections D facing toward the grooved surface of the same. The nut A is then screwed upon the bolt and the projection B is passed in the aperture. If the nut is turned, the washer C will turn with it until the projections D rest against the grooved surface of the washer F. If the nut is still turned, the washer C will be pressed against the washer F, and the projections D will snap into the grooves G G, and will prevent the washer C, and consequently also the nut A, the projection B of which fits into the washer C, from turning, except under the application of considerable force. The nut A is thus locked and cannot be loosened by shocks or vibrations; but if the bolt H is to be removed the nut can be loosened by means of a wrench. The edges of the washer F rest against the flanges and head of the rail, and this washer is thus prevented from rotating. If such flanges or corresponding projections are not on the objects united, the edges or corner of the washer will have to be bent over the edges of the objects to be united, as shown at L in Fig. 4; or, if wooden parts are to be united, a corner of the washer must be bent over and forced into the wood.

If the outer surface of the fish-plate is provided with grooves, as indicated in dotted lines in Fig. 1, the washer F can be dispensed with.

This nut-lock is applicable to any kind of bolts, and can be used in uniting any objects with which bolts are used.

Having thus fully described my invention, I claim as new and desire to secure by Letters Patent—

In a nut-lock, the combination, with the nut A, having a projection, B, on its inner surface, of a washer, C, provided with an aperture, E, corresponding to the projection B, and with one or more projections, D, on its inner surface, and of the washer F, provided with grooves G or recesses, substantially as herein shown and described, and for the purpose set forth.

JOSEPH WATTS.

Witnesses:
JAMES C. DAVIES,
JOHN HARRINGTON.